(12) United States Patent
Bastien et al.

(10) Patent No.: US 9,941,761 B2
(45) Date of Patent: Apr. 10, 2018

(54) INDUCTION MOTOR HAVING FULL PITCH WINDING

(71) Applicant: Nidec Motor Corporation, St. Louis, MO (US)

(72) Inventors: Ryan M. Bastien, Saint Charles, MO (US); Joseph A. Vehige, Saint Charles, MO (US); John H. Hussey, St. Louis, MO (US); Keith I. Hoemann, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 490 days.

(21) Appl. No.: 14/629,276

(22) Filed: Feb. 23, 2015

(65) Prior Publication Data

US 2016/0248288 A1 Aug. 25, 2016

(51) Int. Cl.
| | |
|---|---|
| *H02K 5/20* | (2006.01) |
| *H02K 3/28* | (2006.01) |
| *F04D 25/06* | (2006.01) |
| *F04D 25/08* | (2006.01) |
| *H02K 3/16* | (2006.01) |
| *H02K 7/14* | (2006.01) |
| *H02K 17/16* | (2006.01) |

(52) U.S. Cl.
CPC .......... *H02K 3/28* (2013.01); *F04D 25/0606* (2013.01); *F04D 25/08* (2013.01); *H02K 3/16* (2013.01); *H02K 5/20* (2013.01); *H02K 7/14* (2013.01); *H02K 17/16* (2013.01)

(58) Field of Classification Search
CPC .................................. H02K 3/28; H02K 3/16
USPC ......................................................... 310/208
See application file for complete search history.

(56) References Cited

U.S. PATENT DOCUMENTS

| | | | | |
|---|---|---|---|---|
| 5,898,251 | A * | 4/1999 | Mochizuki | ............... H02K 3/28 29/596 |
| 2010/0213782 | A1* | 8/2010 | Nashiki | .................... H02K 3/28 310/195 |

* cited by examiner

*Primary Examiner* — Terrance Kenerly
(74) *Attorney, Agent, or Firm* — Hovey Williams LLP (57) ABSTRACT

A blower motor is provided for use in a machine. The motor includes a stator and a rotor rotatable about an axis. The stator includes a generally toroidal core, a first-main winding, and an auxiliary winding that is electrically out of phase with the first-main winding. The first-main winding and the auxiliary winding are both full pitch windings.

24 Claims, 5 Drawing Sheets

INDUCTION MOTOR HAVING FULL PITCH WINDING

BACKGROUND OF THE INVENTION

1. Field of the Invention

The present invention relates generally to an electric motor including a stator and a rotor. The stator includes a core and a winding wound about the core.

2. Discussion of the Prior Art

Electric motors are conventionally used in a variety of applications. For instance, an electric motor may be provided in the form of a blower motor for use in a heating, ventilation, and air conditioning (HVAC) system.

Electric motors conventionally include a stator core and at least one winding wound about the core. Winding harmonics often result in noise that, in certain circumstances (e.g., use of a blower motor in an HVAC application), is highly undesirable.

SUMMARY

According to one aspect of the present invention, a blower motor is provided for use in a machine. The motor includes a stator and a rotor rotatable about an axis. The stator includes a generally toroidal core, a first-main winding, and an auxiliary winding that electrically out of phase with the first-main winding. The core includes a plurality of arcuately spaced apart teeth. Each pair of adjacent teeth defines a slot therebetween. The first-main winding includes a plurality of first-main first coils wound about the core. The first-main winding generates a plurality of first-main poles at respective arcuately spaced apart first-main pole locations. Each of the first-main first coils includes a pair of arcuately spaced apart, generally axially extending first-main primary slot portions. Each of the first-main primary slot portions extends through a corresponding one of the slots. Each of the first-main pole locations coincides with a corresponding one of the first-main primary slot portions such that the first-main winding is a full pitch winding. The auxiliary winding includes a plurality of auxiliary first coils wound about the core. The auxiliary winding generates a plurality of auxiliary poles at respective arcuately spaced apart auxiliary pole locations. Each of the auxiliary first coils includes a pair of arcuately spaced apart, generally axially extending auxiliary primary slot portions. Each of the auxiliary primary slot portions extends through a corresponding one of the slots. Each of the auxiliary pole locations coincides with a corresponding one of the auxiliary primary slot portions such that the auxiliary winding is a full pitch winding.

This summary is provided to introduce a selection of concepts in a simplified form.
These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
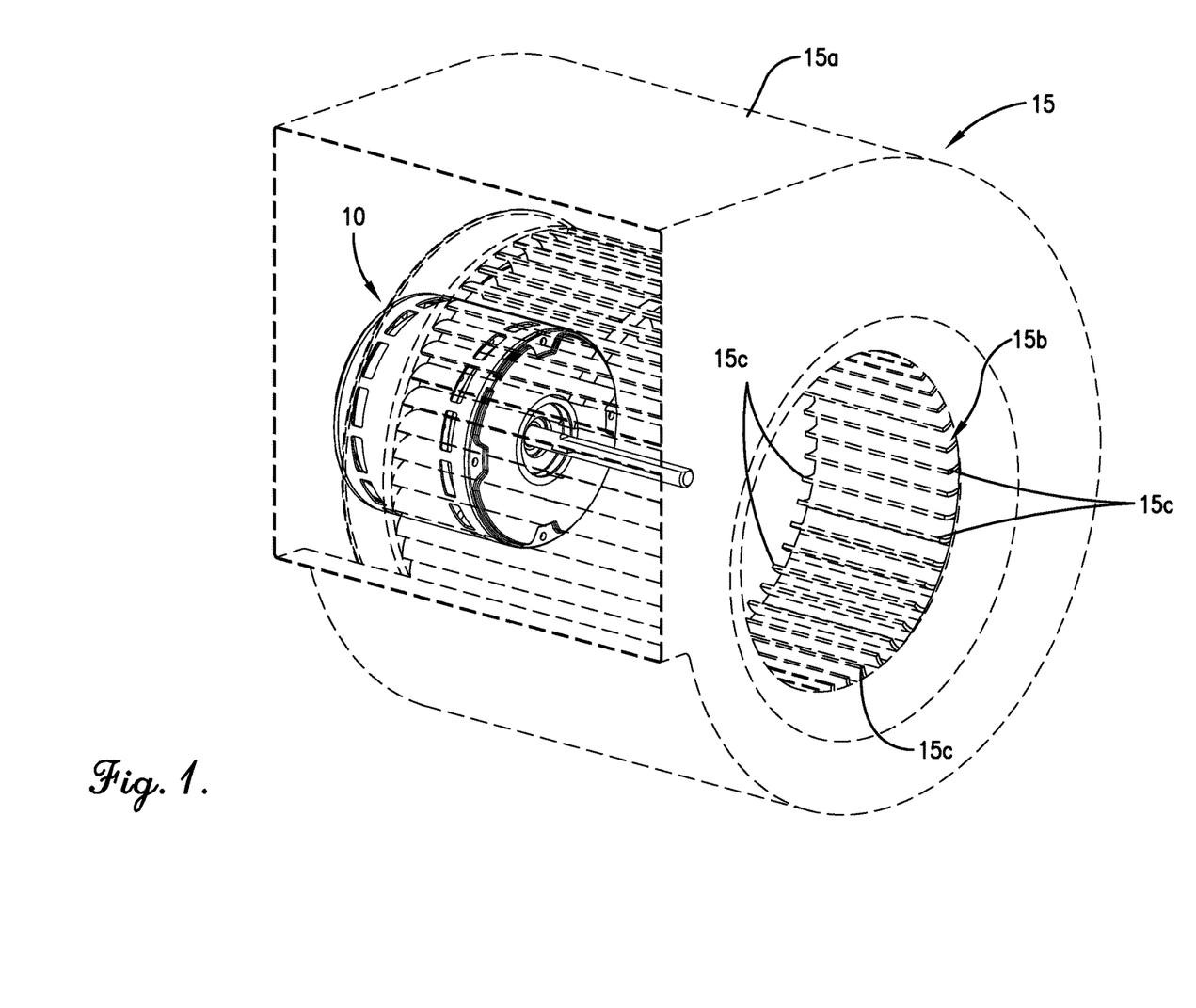
FIG. 1 is a front perspective view of a blower motor constructed in accordance with a preferred embodiment of the present invention, with the motor being depicted in combination with a blower assembly, which is shown only schematically.
Figure 2:
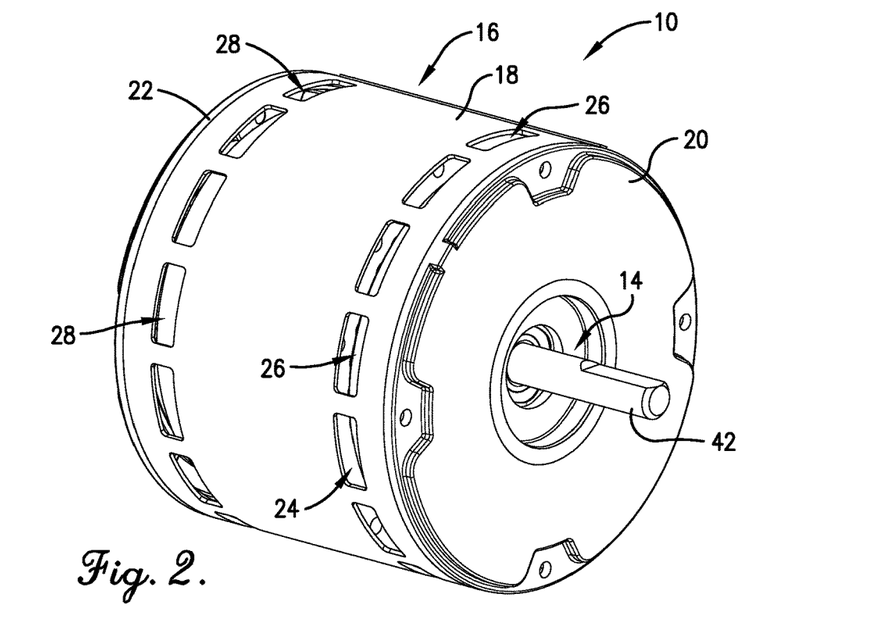
FIG. 2 is a front perspective view of the motor of FIG. 1, with the blower assembly removed.
Figure 3A:
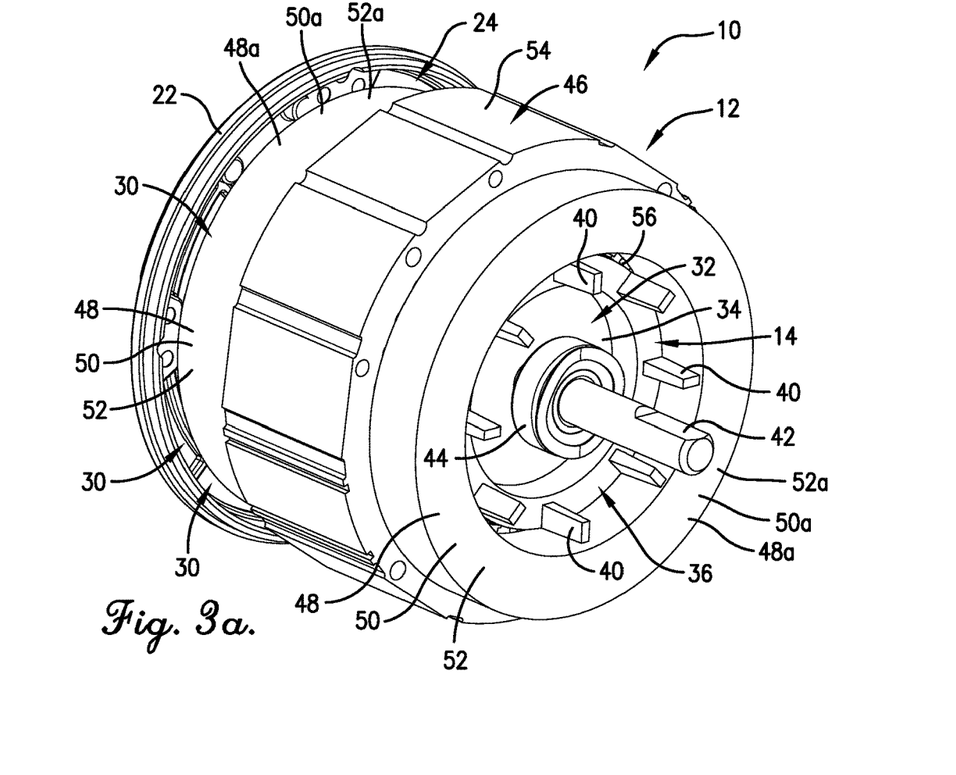
FIG. 3 is a front perspective view of the motor of FIGS. 1 and 2, with the shell, front endshield, and blower assembly removed.

With initial reference to FIGS. 1-3, a motor 10 is provided. The motor 10 includes a stator 12 and a rotor 14. The rotor 14 is rotatable about an axis.

As will be described in greater detail below, the motor 10 is preferably a permanent-split capacitor (PSC) induction motor. It is permissible according to some aspects of the present invention, however, for the motor to be of another type. For instance, the motor might alternatively be a capacitor start motor or a resistance start motor.

The motor 10 is preferably a single-phase motor, although it is permissible according to some aspects of the present invention for the motor to be a multi-phase motor.

The motor 10 is preferably a blower motor for use in an HVAC system. More particularly, as shown in FIG. 1, the motor 10 is preferably provided in combination with a blower assembly 15. The blower assembly 15 preferably includes a housing 15a and a blower wheel 15b including a plurality of vanes 15c. It is permissible, however, for the motor to be a blower motor for use in an alternative application.

In a preferred embodiment, as illustrated, the stator 12 at least substantially circumscribes the rotor 14, such that the motor 10 is an inner rotor motor. It is permissible according to some aspects of the present invention, however, for the motor to instead be an outer rotor motor (i.e., for the rotor to at least substantially circumscribe the stator).

Preferably, a circumferentially extending radial gap (not shown) is defined between the stator 12 and the rotor 14.

The motor 10 further preferably includes a housing 16 including a shell 18 and front and rear endshields 20 and 22, respectively.

The housing 16 preferably defines a motor chamber 24 that at least substantially receives the stator 12 and the rotor 14.

The endshields 20 and 22 preferably support the stator 12 by means of a plurality of fasteners (not shown).

The shell 18 is preferably at least substantially cylindrical in form to circumscribe the stator 12. However, it is permissible according to some aspects of the present invention for the shell to be alternatively shaped. For instance, the shell could be generally cuboidal in form or include a pair of flat sides interconnected by a pair of arcuately extending sides. Furthermore, the shell could alternatively extend only part of the way around the stator.

In a preferred embodiment, axially spaced apart front and rear pluralities of ventilation openings 26 and 28, respectively, are formed in the shell 18. The front ventilation openings 26 are preferably evenly arcuately spaced apart, while the rear ventilation openings 28 are likewise preferably evenly arcuately spaced apart. It is permissible according to some aspects of the present invention, however, for the shell to be at least substantially devoid of openings therethrough or for the ventilation openings to be alternatively configured (e.g., unevenly spaced or provided only at the front of the shell).

The front endshield 20 is preferably at least substantially devoid of openings therethrough. The rear endshield 22, however, preferably defines a plurality of ventilation slots 30 therethrough. The front endshield may alternatively include openings therethrough, however, and/or the rear endshield may be at least substantially devoid of openings.

In a preferred embodiment, the rotor 14 includes a rotor core 32 and a plurality of conductive bars (not shown). More particularly, the rotor core 32 preferably includes a yoke 34 and a plurality of arcuately spaced apart rotor teeth (not shown) extending generally radially outwardly from the yoke 34.

The rotor teeth preferably define a plurality of slots (not shown) therebetween. The conductive bars preferably extend through corresponding ones of the slots.

The slots and, in turn, the conductive bars, may be either skewed (angled) relative to the rotor axis or parallel therewith without departing from the scope of the present invention.

The rotor 14 further preferably includes a front end ring 36 and a rear end ring (not shown). The conductive bars preferably extend between and interconnect the front end ring 36 and the rear end ring.

In a preferred embodiment, the front end ring 36 includes a plurality of integrally formed front blades 40, such that the front end ring 36 acts as a fan upon rotation of the rotor 14. The rear end ring is preferably similarly provided with integrally formed rear blades (not shown). It is permissible according to some aspects of the present invention, however, for the front and/or rear blades to be non-integrally formed. Furthermore, the front and/or rear blades may be omitted entirely.

In a preferred embodiment, the rotor core 32 comprises a plurality of circumferentially continuous rotor laminations (not shown). It is permissible according to some aspects of the present invention, however, for the rotor core to be non-laminated and/or circumferentially discontinuous. For instance, the rotor core might be monolithically formed or comprise a plurality of discrete, interconnected laminated or non-laminated arcuate segments.

In a preferred embodiment, the rotor 14 further includes a rotatable shaft 42.

The rotor 14 is preferably rotatably supported relative to the front and rear endshields 20 and 22, respectively, by means of a front bearing 44 and a rear bearing (not shown).

In a preferred embodiment, the stator 12 includes a generally toroidal stator core 46 and a plurality of windings 48, 50, and 52 wound about the core. The windings 48, 50, and 52 are shown schematically in a first form in FIG. 3 and in a more detailed schematic form in FIGS. 4a-4c, which provide a wiring diagram for the motor 10. The windings 48, 50, and 52 will be discussed in greater detail below.

The stator core 46 may be electrically insulated (e.g., by means of insulative overmolding, paper, and/or powder coating) or non-insulated without departing from the scope of the present invention.

The stator core 46 preferably includes a yoke 54 and a plurality of arcuately spaced apart teeth 56 extending generally radially inwardly from the yoke 54. Each pair of adjacent teeth 56 preferably defines a slot 58 therebetween.

Figure 4A:
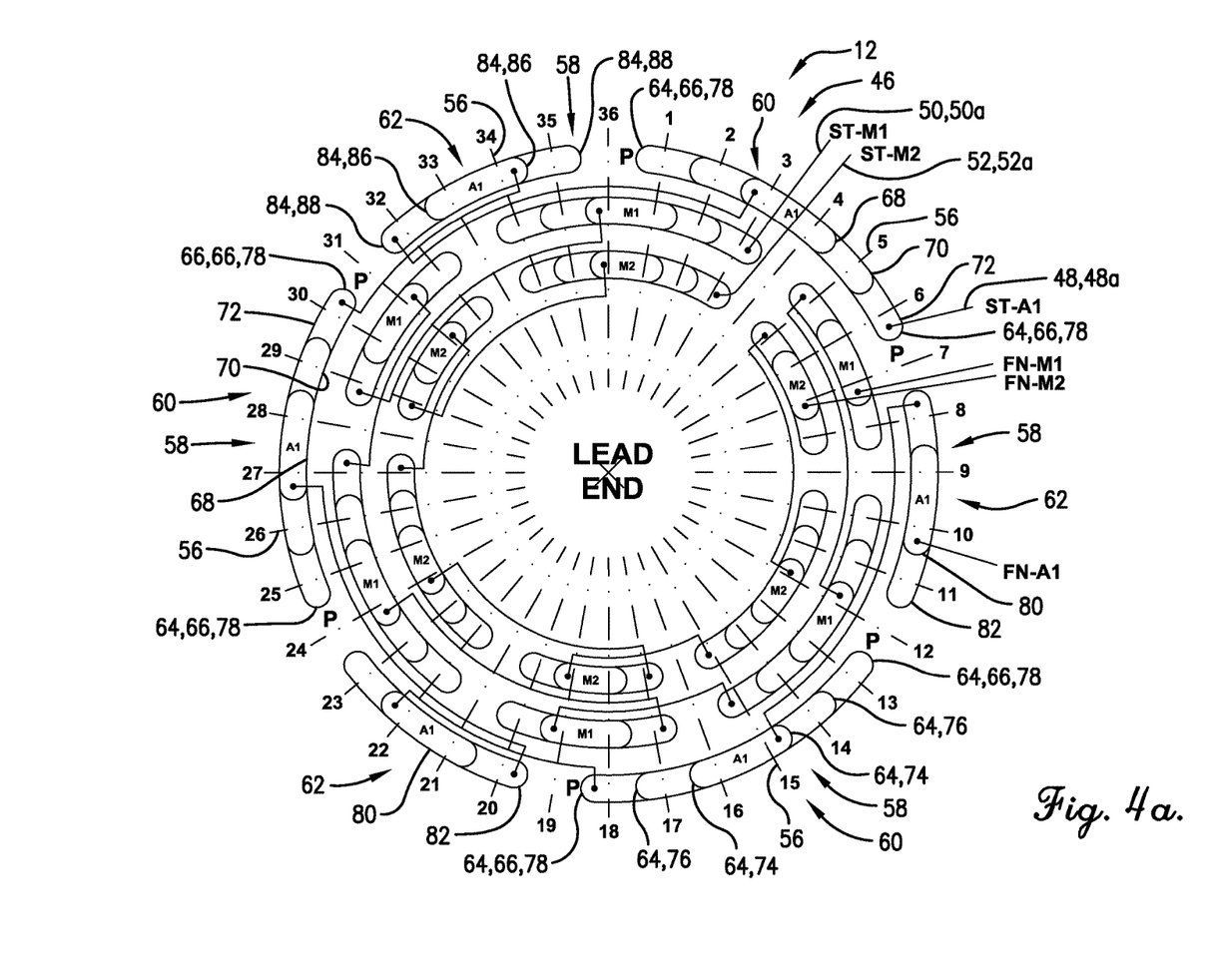
FIG. 4a is a schematic front view of the stator core and windings of the motor of FIGS. 1-3, with the auxiliary winding energized.
Figure 4B:
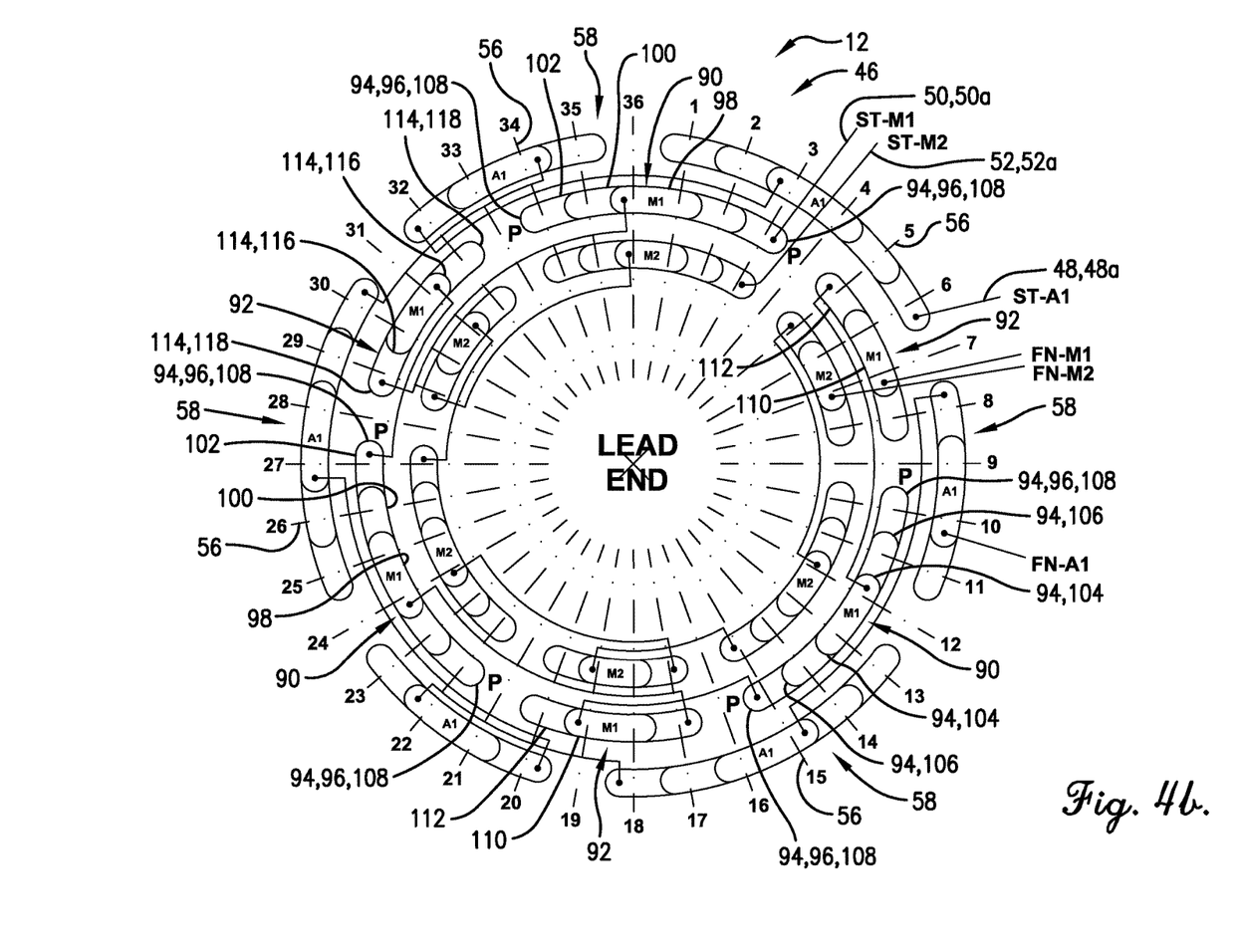
FIG. 4b is a schematic front view of the stator core and windings of the motor of FIGS. 1-3, with the first-main winding energized.
Figure 4C:
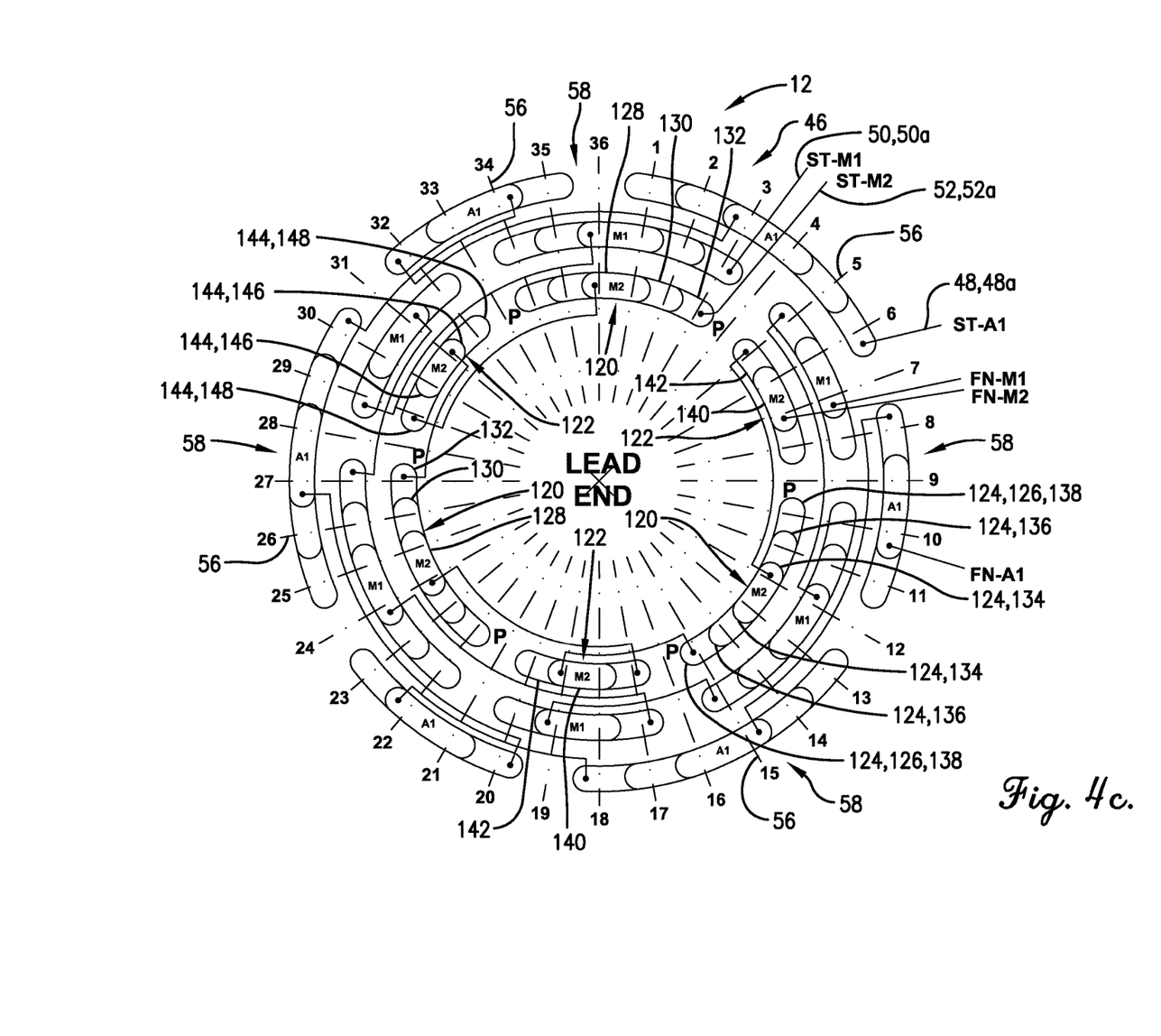
FIG. 4c is a schematic front view of the stator core and windings of the motor of FIGS. 1-3, with the second-main winding energized.

More particularly, as illustrated schematically in FIGS. 4a-4c, the stator core 46 preferably including thirty-six (36) teeth 56 (enumerated 1 to 36 in FIGS. 4a-4c) defining thirty-six (36) slots 58.

As discussed in greater detail below, the motor 10 preferably has a plurality of poles P. Most preferably, the motor 10 has six (6) poles P, such that the motor 10 is a thirty-six (36) slot, six (6) pole motor. The motor 10 thus preferably has a six (6) to one (1) slot:pole ratio. It is permissible according to some aspects of the present invention, however, for the numbers of slots and/or poles to vary from the preferred numbers presented above. For instance, in accordance with the preferred slot:pole ratio, the motor might alternatively have forty-eight (48) slots and eight (8) poles.

In a preferred embodiment and as shown schematically in FIGS. 4a-4c, the windings 48, 50, and 52 are an auxiliary winding 48, a first-main winding 50, and a second-main winding 52. Provision of two (2) main windings 50 and 52 preferably enables operation of the motor 10 at two (2) different speeds. More or fewer windings may be provided without departing from some aspects of the present invention, however. For instance, only one main winding might be provided, or the auxiliary winding might be omitted.

In a preferred embodiment and as illustrated schematically in FIGS. 4a-4c, the auxiliary winding 48 is electrically out of phase with the first-main winding 50 and the second-main winding 52. More particularly, the auxiliary winding 48 is preferably ninety (90) electrical degrees out of phase with the first-main winding 50 and the second-main winding 52, with the first-main winding 50 and the second-main winding 52 being electrically in phase with each other. It is permissible according to some aspects of the present invention, however, for the auxiliary winding to be out of phase with either or both of the first and second-main windings to a greater or lesser extent, for the auxiliary winding to be in phase with one or both of the first and second-main windings, and/or for the first and second-main windings to be electrically out of phase with each other.

As will be discussed in greater detail below, each of the windings 48, 50, and 52 is preferably a full pitch winding.

Each of the windings 48, 50, and 52 is preferably formed of a corresponding wire 48a, 50a, or 52a. The wires 48a, 50a, and 52a each preferably comprise one or more electrically conductive materials such as copper or aluminum.

The wires 48a, 50a, and 52a are each preferably interconnected, such that the auxiliary winding 48, the first-main winding 50, and the second-main winding 52 are all electrically interconnected. Furthermore, a speed tap may be provided at each connection location. It is permissible, however, for one or more of the wires to be disconnected from the others without departing from the scope of the present invention and/or for more or fewer speed taps to be provided. For instance, in an alternative embodiment, the wire ends might be insulated and no speed taps provided.

As noted previously, FIGS. 4a-4c are schematic winding diagrams for the motor 10. More particularly, FIG. 4a is a schematic winding diagram illustrating the motor 10 when the auxiliary winding 48 is energized. FIG. 4b is a schematic winding diagram illustrating the motor 10 when the first-main winding 50 is energized. FIG. 4c is a schematic winding diagram illustrating the motor 10 when the second-main winding 52 is energized. As will be discussed in greater detail below, in keeping with the preferred induction motor configuration, whichever winding of the windings 48, 50, and 52 is energized preferably defines or generates the aforementioned poles P at respective arcuately spaced apart pole locations.

More particularly, with initial reference to FIG. 4a, the auxiliary winding 48 preferably includes a plurality of auxiliary first coils 60 wound about the stator core 46 and a plurality of auxiliary second coils 62 wound about the stator core 46. The auxiliary second coils 62 are preferably alternately arcuately arranged with the auxiliary first coils 60.

The auxiliary winding 48 preferably includes three (3) of the auxiliary first coils 60 and three (3) of the auxiliary second coils 62, although it is permissible according to some aspects of the present invention for different numbers of auxiliary first and/or second coils to be provided.

In a preferred embodiment, each of the auxiliary first coils 60 includes a plurality of auxiliary first slot portions 64 each extending through a corresponding one of the slots 58. (As discussed in greater detail below, a slot portion as referred to herein comprises the portion or portions of the associated wire that extend through a given one of the slots. For instance, an auxiliary first slot portion 64 comprises the portion(s) of the wire 48a that extend through the corresponding slot 58.)

The auxiliary first slot portions 64 of each of the auxiliary first coils 60 preferably include a pair of arcuately spaced apart, generally axially extending auxiliary primary slot portions 66. The location of each pole P preferably coincides with a corresponding one of the auxiliary primary slot portions 66 when the auxiliary winding 48 is energized, such that the auxiliary winding 48 is a full pitch winding. That is, the poles P are located at selected ones of the slots 58 rather than, for instance, on selected ones of the teeth 56.

More particularly, each of the auxiliary first coils 60 preferably includes a plurality of interconnected auxiliary first loops including an auxiliary innermost first loop 68, an auxiliary intermediate first loop 70, and an auxiliary outermost first loop 72. The auxiliary outermost first loop 72 preferably at least substantially circumscribes the auxiliary innermost first loops 68. The auxiliary intermediate first loop 70 is preferably positioned between the auxiliary innermost first loops 68 and the auxiliary outermost first loop 72.

Each auxiliary first loop 68, 70, and 72 preferably comprises a plurality of turns of the wire 48a. (As used herein, the number of turns of a wire is the number of times the wire wraps around a corresponding tooth or teeth). In a low horsepower motor, for instance, each loop might comprise three (3) turns of the wire, while each loop might comprise hundreds of turns of the wire in a high horsepower motor.

Each of the auxiliary innermost first loops 68 preferably includes a pair of arcuately spaced apart, generally axially extending auxiliary innermost first slot portions 74 extending through corresponding ones of the slots 58. Similarly, each of the auxiliary intermediate first loops 70 preferably includes a pair of arcuately spaced apart, generally axially extending auxiliary intermediate first slot portions 76 extending through corresponding ones of the slots 58. Likewise, each of the auxiliary outermost first loops 72 preferably includes a pair of arcuately spaced apart, generally axially extending auxiliary outermost first slot portions 78 extending through corresponding ones of the slots 58.

Preferably, the auxiliary innermost, intermediate, and outermost first slot portions 74, 76, and 78, respectively, all extend through different ones of the slots 58. More particularly, in a preferred embodiment, the auxiliary innermost, intermediate, and outermost first loops 68, 70, and 72 of each of the auxiliary first coils 60 are concentric and respectively circumscribe two (2), four (4), and six (6) of the teeth 56. For instance, in the preferred embodiment shown schematically in FIG. 4a and others, the auxiliary innermost first loops 68 of a selected one of the auxiliary first coils 60 circumscribes teeth 3-4. The auxiliary intermediate first loop 70 of the same one of the auxiliary first coils 60 circumscribes teeth 2-3-4-5. The auxiliary outermost first loop 72 of the same one of the auxiliary first coils 60 circumscribes teeth 1-2-3-4-5-6.

In a preferred embodiment, as shown in FIG. 4a, the locations of the poles P when the auxiliary winding 48 is energized preferably correspond with respective ones of the auxiliary outermost first slot portions 78, such that the auxiliary outermost first slot portions 78 are the auxiliary primary slot portions 66. That is, each of the pairs of auxiliary primary slot portions 66 defines a pair of arcuately spaced apart outermost margins of the corresponding auxiliary first coil 60.

In a preferred embodiment, each of the auxiliary second coils 62 includes a pair of interconnected auxiliary second loops including an auxiliary innermost second loop 80 and an auxiliary outermost second loop 82. The auxiliary outermost second loop 82 preferably at least substantially circumscribes the auxiliary innermost second loop 80.

Similar to the auxiliary first loops 68, 70, and 72 of the auxiliary first coils 60, each auxiliary second loop 80 and 82 of the auxiliary second coils 62 preferably comprises a plurality of turns of the wire 48a.

In a preferred embodiment, each of the auxiliary second coils 62 includes a plurality of auxiliary second slot portions 84 each extending through a corresponding one of the slots 58. More particularly, each of the auxiliary innermost second loops 80 preferably includes a pair of arcuately spaced apart, generally axially extending auxiliary innermost second slot portions 86 extending through corresponding ones of the slots 58. Likewise, each of the auxiliary outermost second loops 82 preferably includes a pair of arcuately spaced apart, generally axially extending auxiliary outermost second slot portions 88 extending through corresponding ones of the slots 58.

Preferably, the auxiliary innermost and outermost second slot portions 86 and 88, respectively, all extend through different ones of the slots 58. More particularly, in a preferred embodiment, the auxiliary innermost and outermost second loops 80 and 82 of each of the auxiliary second coils 62 are concentric and respectively circumscribe two (2) and four (4) of the teeth 56. For instance, in the preferred embodiment shown schematically in FIG. 4a and others, the auxiliary innermost second loop 80 of a selected one of the auxiliary second coils 62 circumscribes teeth 9-10. The auxiliary outermost second loop 82 of the same one of the auxiliary second coils 62 extends around teeth 8-9-10-11.

Furthermore, the auxiliary primary slot portions 66 preferably extend through different ones of the slots 58 than any of the auxiliary second slot portions 84 (i.e., the auxiliary innermost and outermost second slot portions 86 and 88, respectively), such that the poles P are spaced from the auxiliary second slot portions 84 when the auxiliary winding 48 is energized.

Yet further, in keeping with the preferred arcuately alternating arrangement of the auxiliary first and second coils 60 and 62, respectively, it is preferred that the auxiliary first slot portions 64 (including the auxiliary innermost, intermediate, and outermost first slot portions 74, 76, and 78, respectively) and the auxiliary second slot portions 84 (including the auxiliary innermost and outermost second slot portions 86 and 88, respectively) all extend through different ones of the slots 58.

Such a preferred arrangement is particularly conducive toward efficient winding of the auxiliary first and second coils 60 and 62, as interference with already-wound slot portions is avoided as winding progresses. It is permissible according to some aspects of the present invention, however, for an alternative winding layout to be used in which at least some of the slots are shared.

For instance, rather than including three (3) auxiliary first coils and three (3) auxiliary second coils, the auxiliary winding might alternatively include six at least substantially identical coils, each including an innermost loop circumscribing two (2) teeth and presenting a pair of innermost slot portions, an intermediate loop circumscribing four (4) teeth and presenting a pair of intermediate slot portions, and an outermost loop circumscribing (6) teeth and presenting a pair of outermost slot portions. In such an alternative embodiment, assuming the preferred thirty-six (36) tooth, thirty-six (36) slot stator core configuration is retained, each outermost slot portion will extend through the same slot as one of the outermost slot portions of an adjacent one of the coils.

It is particularly noted, however, that the above-described alternative uniform coil embodiment retains the essence of the pole positioning principles of the preferred embodiment. That is, each pole in the alternative uniform coil embodiment is located at one of the slots so as to coincide with a slot portion. More particularly, each pole in the alternative uniform coil embodiment is located at one of the shared slots so as to coincide with a pair of outermost slot portions each associated with a different one of a pair of adjacent coils.

In a preferred embodiment, the first-main winding 50 is configured similarly to the auxiliary winding 48. More particularly, as shown in FIGS. 4a-4c, the first-main winding 50 is preferably configured identically to the auxiliary winding 48 except for being rotated relative the auxiliary winding 48 by ninety (90) electrical degrees and being positioned radially inwardly relative to the auxiliary winding 48.

Therefore, for the sake of brevity and clarity, redundant descriptions, particularly of permissible variations to the preferred winding configurations, will be generally avoided here. Unless otherwise specified, the detailed descriptions of the auxiliary winding 48 should therefore be understood to apply at least generally to the first-main winding 50, as well.

With particular reference to FIG. 4b, the first-main winding 50 preferably includes a plurality of first-main first coils 90 wound about the stator core 46 and a plurality of first-main second coils 92 wound about the stator core 46. The first-main second coils 92 are preferably alternately arcuately arranged with the first-main first coils 90.

The first-main winding 50 preferably includes three (3) of the first-main first coils 90 and three (3) of the first-main second coils 92.

In a preferred embodiment, each of the first-main first coils 90 includes a plurality of first-main first slot portions 94 each extending through a corresponding one of the slots 58.

The first-main first slot portions 94 of each of the first-main first coils 90 preferably include a pair of arcuately spaced apart, generally axially extending first-main primary slot portions 96. The location of each pole P preferably coincides with a corresponding one of the first-main primary slot portions 96 when the first-main winding 50 is energized, such that the first-main winding 50 is a full pitch winding. That is, the poles P are located at selected ones of the slots 58 rather than, for instance, on selected ones of the teeth 56.

More particularly, each of the first-main first coils 90 preferably includes a plurality of interconnected first-main first loops including a first-main innermost first loop 98, a first-main intermediate first loop 100, and a first-main outermost first loop 102. The first-main outermost first loop 102 preferably at least substantially circumscribes the first-main innermost first loop 98. The first-main intermediate first loop 100 is preferably positioned between the first-main innermost first loop 98 and the first-main outermost first loop 102.

Each first-main first loop 98, 100, and 102 preferably comprises a plurality of turns of the wire 50a.

Each of the first-main innermost first loops 98 preferably includes a pair of arcuately spaced apart, generally axially extending first-main innermost first slot portions 104 extending through corresponding ones of the slots 58. Similarly, each of the first-main intermediate first loops 100 preferably includes a pair of arcuately spaced apart, generally axially extending first-main intermediate first slot portions 106 extending through corresponding ones of the slots 58. Likewise, each of the first-main outermost first loops 102 preferably includes a pair of arcuately spaced apart, generally axially extending first-main outermost first slot portions 108 extending through corresponding ones of the slots 58.

Preferably, the first-main innermost, intermediate, and outermost first slot portions 104, 106, and 108, respectively, all extend through different ones of the slots 58. More particularly, in a preferred embodiment, the first-main innermost, intermediate, and outermost first loops 98, 100, and 102 of each of the first-main first coils 90 are concentric and respectively circumscribe two (2), four (4), and six (6) of the teeth 56. For instance, in the preferred embodiment shown schematically in FIG. 4b and others, the first-main innermost first loop 98 of a selected one of the first-main first coils 90 circumscribes teeth 36-1. The first-main intermediate first loop 100 of the same one of the first-main first coils 90 circumscribes teeth 35-36-1-2. The first-main outermost first loop 102 of the same one of the first-main first coils 90 circumscribes teeth 34-35-36-1-2-3.

In a preferred embodiment, as shown in FIG. 4b, the locations of the poles P when the first-main winding 50 is energized preferably correspond with respective ones of the first-main outermost first slot portions 108, such that the first-main outermost first slot portions 108 are the first-main primary slot portions 96. That is, each of the pairs of first-main primary slot portions 96 defines a pair of arcuately spaced apart outermost margins of the corresponding first-main first coil 90.

In a preferred embodiment, each of the first-main second coils 92 includes a pair of interconnected first-main second loops including a first-main innermost second loop 110 and a first-main outermost second loop 112. The first-main outermost second loop 112 preferably at least substantially circumscribes the first-main innermost second loop 110.

Similar to the first-main first loops 98, 100, and 102 of the first-main first coils 90, each first-main second loop 110 and 112 of the first-main second coils 92 preferably comprises a plurality of turns of the wire 50a.

In a preferred embodiment, each of the first-main second coils 92 includes a plurality of first-main second slot portions 114 each extending through a corresponding one of the slots 58. More particularly, each of the first-main innermost second loops 110 preferably includes a pair of arcuately spaced apart, generally axially extending first-main innermost second slot portions 116 extending through corresponding ones of the slots 58. Likewise, each of the first-main outermost second loops 112 preferably includes a pair of arcuately spaced apart, generally axially extending first-main outermost second slot portions 118 extending through corresponding ones of the slots 58.

Preferably, the first-main innermost and outermost second slot portions 116 and 118, respectively, all extend through different ones of the slots 58. More particularly, in a preferred embodiment, the first-main innermost and outermost second loops 110 and 112 of each of the first-main second coils 92 are concentric and respectively circumscribe two (2) and four (4) of the teeth 56. For instance, in the preferred embodiment shown schematically in FIG. 4b and others, the first-main innermost second loop 110 of a selected one of the first-main second coils 92 circumscribes teeth 6-7. The first-main outermost second loop 112 of the same one of the first-main second coils 92 circumscribes teeth 5-6-7-8.

Furthermore, the first-main primary slot portions 96 preferably extend through different ones of the slots 58 than any of the first-main second slot portions 114 (i.e., the first-main innermost and outermost second slot portions 116 and 118, respectively) such that the poles P are spaced from the first-main second slot portions 116 and 118 when the first-main winding 50 is energized.

Yet further, in keeping with the preferred arcuately alternating arrangement of the first-main first and second coils 90 and 92, respectively, it is preferred that the first-main first slot portions 94 (including the first-main innermost, intermediate, and outermost first slot portions 104, 106, and 108, respectively) and the first-main second slot portions 114 (including the first-main innermost and outermost second slot portions 116 and 118, respectively) all extend through different ones of the slots 58.

In a preferred embodiment, the second-main winding 52 is configured similarly to the auxiliary winding 48 and the first-main winding 50. More particularly, as shown in FIGS. 4a-4c, the second-main winding 52 is preferably configured identically to the auxiliary winding 48 except for being rotated relative to the auxiliary winding 48 by ninety (90) electrical degrees and being positioned radially inwardly relative to the auxiliary winding 48. The second-main winding is preferably configured identically to the first-main winding 50 except for being positioned radially inwardly relative thereto.

Therefore, for the sake of brevity and clarity, redundant descriptions, particularly in regard to permissible variations of the winding configurations, will be generally avoided here. Unless otherwise specified, the detailed descriptions of the auxiliary winding 48 and the first-main winding 50 should therefore be understood to apply at least generally to the second-main winding 52, as well.

With particular reference to FIG. 4c, the second-main winding 52 preferably includes a plurality of second-main first coils 120 wound about the stator core 46 and a plurality of second-main second coils 122 wound about the stator core 46. The second-main second coils 122 are preferably alternately arcuately arranged with the second-main first coils 120.

The second-main winding 52 preferably includes three (3) of the second-main first coils 120 and three (3) of the second-main second coils 122.

In a preferred embodiment, each of the second-main first coils 120 includes a plurality of second-main first slot portions 124 each extending through a corresponding one of the slots 58.

The second-main first slot portions 124 of each of the second-main first coils 120 preferably include a pair of arcuately spaced apart, generally axially extending second-main primary slot portions 126. The location of each pole P preferably coincides with a corresponding one of the second-main primary slot portions 126 when the second-main winding 52 is energized, such that the second-main winding 52 is a full pitch winding. That is, the poles P are located at selected ones of the slots 58 rather than, for instance, on selected ones of the teeth 56.

More particularly, each of the second-main first coils 120 preferably includes a plurality of interconnected second-main first loops including a second-main innermost first loop 128, a second-main intermediate first loop 130, and a second-main outermost first loop 132. The second-main outermost first loop 132 preferably at least substantially circumscribes the second-main innermost first loop 128. The second-main intermediate first loop 130 is preferably positioned between the second-main innermost first loop 128 and the second-main outermost first loop 132.

Each second-main first loop 128, 130, and 132 preferably comprises a plurality of turns of the wire 52a.

Each of the second-main innermost first loops 128 preferably includes a pair of arcuately spaced apart, generally axially extending second-main innermost first slot portions 134 extending through corresponding ones of the slots 58. Similarly, each of the second-main intermediate first loops 130 preferably includes a pair of arcuately spaced apart, generally axially extending second-main intermediate first slot portions 136 extending through corresponding ones of the slots 58. Likewise, each of the second-main outermost first loops 132 preferably includes a pair of arcuately spaced apart, generally axially extending second-main outermost first slot portions 138 extending through corresponding ones of the slots 58.

Preferably, the second-main innermost, intermediate, and outermost first slot portions 134, 136, and 138, respectively, all extend through different ones of the slots 58. More particularly, in a preferred embodiment, the second-main innermost, intermediate, and outermost first loops 128, 130, and 132 of each of the second-main first coils 120 are concentric and respectively circumscribe two (2), four (4), and six (6) of the teeth 56. For instance, in the preferred embodiment shown schematically in FIG. 4c and others, the second-main innermost first loop 128 of a selected one of the second-main first coils 120 circumscribes teeth 36-1. The second-main intermediate first loop 130 of the same one of the second-main first coils 120 circumscribes teeth 35-36-

1-2. The second-main outermost first loop 132 of the same one of the second-main first coils 120 circumscribes teeth 34-35-36-1-2-3.

In a preferred embodiment, as shown in FIG. 4c, the locations of the poles P when the second-main winding 52 is energized preferably correspond with respective ones of the second-main outermost first slot portions 138, such that the second-main outermost first slot portions 138 are the second-main primary slot portions 126. That is, each of the pairs of second-main primary slot portions 126 defines a pair of arcuately spaced apart outermost margins of the corresponding second-main first coil 120.

In a preferred embodiment, each of the second-main second coils 122 includes a pair of interconnected second-main second loops including a second-main innermost second loop 140 and a second-main outermost second loop 142. The second-main outermost second loop 142 preferably at least substantially circumscribes the second-main innermost second loop 140.

Similar to the second-main first loops 128, 130, and 132 of the second-main first coils 120, each second-main second loop 140 and 142 of the second-main second coils 122 preferably comprises a plurality of turns of the wire 52a.

In a preferred embodiment, each of the second-main second coils 122 includes a plurality of second-main second slot portions 144 each extending through a corresponding one of the slots 58. More particularly, each of the second-main innermost second loops 140 preferably includes a pair of arcuately spaced apart, generally axially extending second-main innermost second slot portions 146 extending through corresponding ones of the slots 58. Likewise, each of the second-main outermost second loops 142 preferably includes a pair of arcuately spaced apart, generally axially extending second-main outermost second slot portions 148 extending through corresponding ones of the slots 58.

Preferably, the second-main innermost and outermost second slot portions 146 and 148, respectively, all extend through different ones of the slots 58. More particularly, in a preferred embodiment, the second-main innermost and outermost second loops 140 and 142 of each of the second-main second coils 122 are concentric and respectively circumscribe two (2) and four (4) of the teeth 56. For instance, in the preferred embodiment shown schematically in FIG. 4c and others, the second-main innermost second loop 140 of a selected one of the second-main second coils 122 circumscribes teeth 6-7. The second-main outermost second loop 142 of the same one of the second-main second coils 122 circumscribes teeth 5-6-7-8.

Furthermore, the second-main primary slot portions 126 preferably extend through different ones of the slots 58 than any of the second-main second slot portions 144 (i.e., the second-main innermost and outermost second slot portions 146 and 148), such that the poles P are spaced from the second-main second slot portions 146 and 148 when the second-main winding 52 is energized.

Yet further, in keeping with the preferred arcuately alternating arrangement of the second-main first and second coils 120 and 122, respectively, it is preferred that the second-main first slot portions 124 (including the second-main innermost, intermediate, and outermost first slot portions 134, 136, and 138, respectively) and the second-main second slot portions 144 (including the second-main innermost and outermost second slot portions 146 and 148, respectively) all extend through different ones of the slots 58.

As noted previously, it is preferred that the auxiliary winding 48, the first-main winding 50, and the second-main winding 52 are each full pitch windings. It is permissible according to some aspects of the present invention, however, for one or more of the windings to instead be a fractional pitch winding. Most preferably, though, the motor includes at least one full pitch auxiliary winding and at least one full pitch main winding.

Provision of exclusively full pitch auxiliary and main windings as described preferably reduces winding harmonics to an almost negligible level and, in turn, drastically reduces overall motor noise levels. In contrast to conventional means of reducing noise (e.g., expanding the air gap between the rotor and the stator while continuing to provide conventional fractional pitch windings), which dampen the winding harmonics but do not address the source of the noise, the full pitch coil layout described herein preferably reduces the source of the problem and results in a motor that is not only quieter but is also more resilient to mechanical variation. Such a solution is particularly advantageous in blower motor applications.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A blower motor for use in a machine, said motor comprising:
   a stator; and
   a rotor rotatable about an axis,
   said stator including—
      a generally toroidal core including a plurality of arcuately spaced apart teeth,
      each pair of adjacent teeth defining a slot therebetween,
      a first-main winding, and
      an auxiliary winding that is electrically out of phase with the first-main winding,
      said first-main winding including a plurality of first-main first coils wound about the core,
      said first-main winding generating a plurality of first-main poles at respective arcuately spaced apart first-main pole locations,
      each of said first-main first coils including a pair of arcuately spaced apart, generally axially extending first-main primary slot portions,
      each of said first-main primary slot portions extending through a corresponding one of the slots,
      each of said first-main pole locations coinciding with a corresponding one of the first-main primary slot portions such that the first-main winding is a full pitch winding,
      said auxiliary winding including a plurality of auxiliary first coils wound about the core, said auxiliary winding generating a plurality of auxiliary poles at respective arcuately spaced apart auxiliary pole locations, each of said auxiliary first coils including a pair of arcuately spaced apart, generally axially extending auxiliary primary slot portions, each of said auxiliary primary slot portions extending through a corresponding one of the slots, each of said auxiliary pole locations coinciding with a corresponding one of the auxiliary primary slot portions such that the auxiliary winding is a full pitch winding, each of said first-main first coils comprising a plurality of interconnected first-main first loops including a first-main innermost first loop, a first-main outermost first loop at least substantially circumscribing the first-main innermost first loop, and a first-main intermediate loop positioned between the first-main innermost first loop and the first-main outermost first loop, each of said first-main innermost first loops including a pair of arcuately spaced apart, generally axially extending first-main innermost first slot portions, each of said first-main intermediate first loops including a pair of arcuately spaced apart, generally axially extending first-main intermediate first slot portions, each of said first-main innermost and intermediate first slot portions extending through a corresponding one of the slots, each of said first-main outermost first loops presenting the first-main primary slot portions for that first-main first coil, said first-main winding including a plurality of first-main second coils wound about the core, said first-main second coils being alternately arcuately arranged with the first-main first coils, each of said first-main second coils comprising a pair of interconnected first-main second loops including a first-main innermost second loop and a first-main outermost second loop at least substantially circumscribing the first-main innermost second loop, each of said first-main innermost second loops including a pair of arcuately spaced apart, generally axially extending first-main innermost second slot portions, each of said first-main outermost second loops including a pair of arcuately spaced apart, generally axially extending first-main outermost second slot portions, each of said first-main innermost and outermost second slot portions extending through a corresponding one of the slots.

2. The motor as claimed in claim 1, said first-main innermost and outermost second loops of each of the first-main second coils respectively circumscribing two and four of the teeth.

3. A blower motor for use in a machine, said motor comprising:

a stator; and a rotor rotatable about an axis, said stator including— a generally toroidal core including a plurality of arcuately spaced apart teeth, each pair of adjacent teeth defining a slot therebetween, a first-main winding, and an auxiliary winding that is electrically out of phase with the first-main winding, said first-main winding including a plurality of first-main first coils wound about the core, said first-main winding generating a plurality of first-main poles at respective arcuately spaced apart first-main pole locations, each of said first-main first coils including a pair of arcuately spaced apart, generally axially extending first-main primary slot portions, each of said first-main primary slot portions extending through a corresponding one of the slots, each of said first-main pole locations coinciding with a corresponding one of the first-main primary slot portions such that the first-main winding is a full pitch winding, said auxiliary winding including a plurality of auxiliary first coils wound about the core, said auxiliary winding generating a plurality of auxiliary poles at respective arcuately spaced apart auxiliary pole locations, each of said auxiliary first coils including a pair of arcuately spaced apart, generally axially extending auxiliary primary slot portions, each of said auxiliary primary slot portions extending through a corresponding one of the slots, each of said auxiliary pole locations coinciding with a corresponding one of the auxiliary primary slot portions such that the auxiliary winding is a full pitch winding, each of said auxiliary first coils comprising a plurality of interconnected auxiliary first loops including an auxiliary innermost first loop, an auxiliary outermost first loop at least substantially circumscribing the auxiliary innermost first loop, and an auxiliary intermediate first loop positioned between the auxiliary innermost first loop and the auxiliary outermost first loop, each of said auxiliary innermost first loops including a pair of arcuately spaced apart, generally axially extending auxiliary innermost first slot portions, each of said auxiliary intermediate first loops including a pair of arcuately spaced apart, generally axially extending auxiliary intermediate first slot portions, each of said auxiliary innermost and intermediate first slot portions extending through a corresponding one of the slots, each of said auxiliary outermost first loops presenting the auxiliary primary slot portions for that auxiliary first coil, said auxiliary winding including a plurality of auxiliary second coils wound about the core, said auxiliary second coils being alternately arcuately arranged with the auxiliary first coils, each of said auxiliary second coils comprising a pair of interconnected auxiliary second loops including an auxiliary innermost second loop and an auxiliary outermost second loop at least substantially circumscribing the auxiliary innermost second loop, each of said auxiliary innermost second loops including a pair of arcuately spaced apart, generally axially extending auxiliary innermost second slot portions, each of said auxiliary outermost second loops including a pair of arcuately spaced apart, generally axially extending auxiliary outermost second slot portions, each of said auxiliary innermost and outermost second slot portions extending through a corresponding one of the slots.

4. The motor as claimed in claim 3,
said auxiliary innermost and outermost second loops of each of the auxiliary second coils respectively circumscribing two and four of the teeth.

5. A blower motor for use in a machine, said motor comprising:
a stator; and
a rotor rotatable about an axis,
said stator including—
a generally toroidal core including a plurality of arcuately spaced apart teeth,
each pair of adjacent teeth defining a slot therebetween,
a first-main winding, and
an auxiliary winding that is electrically out of phase with the first-main winding,
said first-main winding including a plurality of first-main first coils wound about the core,
said first-main winding generating a plurality of first-main poles at respective arcuately spaced apart first-main pole locations,
each of said first-main first coils including a pair of arcuately spaced apart, generally axially extending first-main primary slot portions,
each of said first-main primary slot portions extending through a corresponding one of the slots,
each of said first-main pole locations coinciding with a corresponding one of the first-main primary slot portions such that the first-main winding is a full pitch winding,
said auxiliary winding including a plurality of auxiliary first coils wound about the core,
said auxiliary winding generating a plurality of auxiliary poles at respective arcuately spaced apart auxiliary pole locations,
each of said auxiliary first coils including a pair of arcuately spaced apart, generally axially extending auxiliary primary slot portions,
each of said auxiliary primary slot portions extending through a corresponding one of the slots,
each of said auxiliary pole locations coinciding with a corresponding one of the auxiliary primary slot portions such that the auxiliary winding is a full pitch winding,
said auxiliary winding being 90 electrical degrees out of phase with the first-main winding.

6. The motor as claimed in claim 5,
each of said pairs of first-main primary slot portions defining a pair of arcuately spaced apart outermost margins of the corresponding first-main first coil.

7. The motor as claimed in claim 6,
said first-main winding further including a plurality of first-main second coils wound about the core,
said first-main second coils being alternately arcuately arranged with the first-main first coils,
each of said first-main second coils including a plurality of arcuately spaced apart, generally axially extending first-main second slot portions,
each of said first-main second slot portions extending through a corresponding one of the slots.

8. The motor as claimed in claim 7,
said first-main primary slot portions extending through different ones of the slots than any of the first-main second slot portions, such that the first-main pole locations are spaced from the first-main second slot portions.

9. The motor as claimed in claim 5,
each of said first-main first coils comprising a plurality of interconnected first-main first loops including a first-main innermost first loop, a first-main outermost first loop at least substantially circumscribing the first-main innermost first loop, and a first-main intermediate loop positioned between the first-main innermost first loop and the first-main outermost first loop,
each of said first-main innermost first loops including a pair of arcuately spaced apart, generally axially extending first-main innermost first slot portions,
each of said first-main intermediate first loops including a pair of arcuately spaced apart, generally axially extending first-main intermediate first slot portions,
each of said first-main innermost and intermediate first slot portions extending through a corresponding one of the slots,
each of said first-main outermost first loops presenting the first-main primary slot portions for that first-main first coil.

10. The motor as claimed in claim 9,
said first-main innermost, intermediate, and outermost first loops of each of the first-main first coils respectively circumscribing two, four, and six of the teeth.

11. The motor as claimed in claim 9,
said motor including a first-main wire forming the first-main winding,
said first-main innermost, intermediate, and outermost first loops of each of the first-main first coils each comprising a plurality of turns of the first-main wire.

12. The motor as claimed in claim 9,
said first-main winding including a plurality of first-main second coils wound about the core,
said first-main second coils being alternately arcuately arranged with the first-main first coils,
each of said first-main second coils comprising a pair of interconnected first-main second loops including a first-main innermost second loop and a first-main outermost second loop at least substantially circumscribing the first-main innermost second loop,
each of said first-main innermost second loops including a pair of arcuately spaced apart, generally axially extending first-main innermost second slot portions,
each of said first-main outermost second loops including a pair of arcuately spaced apart, generally axially extending first-main outermost second slot portions,
each of said first-main innermost and outermost second slot portions extending through a corresponding one of the slots.

13. The motor as claimed in claim 5,
each of said pairs of auxiliary primary slot portions defining a pair of arcuately spaced apart outermost margins of the corresponding auxiliary first coil.

14. The motor as claimed in claim 13,
said auxiliary winding further including a plurality of auxiliary second coils wound about the core,
said auxiliary second coils being alternately arcuately arranged with the auxiliary first coils,
each of said auxiliary second coils including a plurality of arcuately spaced apart, generally axially extending auxiliary second slot portions,
each of said auxiliary second slot portions extending through a corresponding one of the slots.

15. The motor as claimed in claim 14,
said auxiliary primary slot portions extending through different ones of the slots than any of the auxiliary second slot portions, such that the auxiliary pole locations are spaced from the auxiliary second slot portions.

16. The motor as claimed in claim 5,
each of said auxiliary first coils comprising a plurality of interconnected auxiliary first loops including an auxiliary innermost first loop, an auxiliary outermost first loop at least substantially circumscribing the auxiliary innermost first loop, and an auxiliary intermediate first loop positioned between the auxiliary innermost first loop and the auxiliary outermost first loop,
each of said auxiliary innermost first loops including a pair of arcuately spaced apart, generally axially extending auxiliary innermost first slot portions,
each of said auxiliary intermediate first loops including a pair of arcuately spaced apart, generally axially extending auxiliary intermediate first slot portions,
each of said auxiliary innermost and intermediate first slot portions extending through a corresponding one of the slots,
each of said auxiliary outermost first loops presenting the auxiliary primary slot portions for that auxiliary first coil.

17. The motor as claimed in claim 16,
said auxiliary innermost, intermediate, and outermost first loops of each of the auxiliary first coils respectively circumscribing two, four, and six of the teeth.

18. The motor as claimed in claim 16,
said motor including an auxiliary wire forming the auxiliary winding,
said auxiliary innermost, intermediate, and outermost first loops of each of the auxiliary first coils each comprising a plurality of turns of the auxiliary wire.

19. The motor as claimed in claim 16,
said auxiliary winding including a plurality of auxiliary second coils wound about the core,
said auxiliary second coils being alternately arcuately arranged with the auxiliary first coils,
each of said auxiliary second coils comprising a pair of interconnected auxiliary second loops including an auxiliary innermost second loop and an auxiliary outermost second loop at least substantially circumscribing the auxiliary innermost second loop,
each of said auxiliary innermost second loops including a pair of arcuately spaced apart, generally axially extending auxiliary innermost second slot portions,
each of said auxiliary outermost second loops including a pair of arcuately spaced apart, generally axially extending auxiliary outermost second slot portions,
each of said auxiliary innermost and outermost second slot portions extending through a corresponding one of the slots.

20. The motor as claimed in claim 5, said motor having a slot to pole ratio of 6 to 1.

21. The motor as claimed in claim 5, said motor having 36 slots and 6 poles.

22. The motor as claimed in claim 5, said motor being an induction motor.

23. The motor as claimed in claim 5,
said stator further including a third winding,
said third winding being a second-main winding that is electrically in phase with the first-main winding,
said second-main winding including a plurality of second-main first coils wound about the core,
said second-main winding generating a plurality of second-main poles at respective arcuately spaced apart second-main pole locations,
each of said second-main first coils including a pair of arcuately spaced apart, generally axially extending second-main primary slot portions,
each of said second-main primary slot portions extending through a corresponding one of the slots,
each of said second-main pole locations coinciding with a corresponding one of the second-main primary slot portions such that the second-main winding is a full pitch winding.

24. A blower motor for use in a machine, said motor comprising:
a stator; and
a rotor rotatable about an axis,
said stator including—
a generally toroidal core including a plurality of arcuately spaced apart teeth,
each pair of adjacent teeth defining a slot therebetween,
a first-main winding, and
an auxiliary winding that is electrically out of phase with the first-main winding,
said first-main winding including a plurality of first-main first coils wound about the core,
said first-main winding generating a plurality of first-main poles at respective arcuately spaced apart first-main pole locations,
each of said first-main first coils including a pair of arcuately spaced apart, generally axially extending first-main primary slot portions,
each of said first-main primary slot portions extending through a corresponding one of the slots,
each of said first-main pole locations coinciding with a corresponding one of the first-main primary slot portions such that the first-main winding is a full pitch winding,
said auxiliary winding including a plurality of auxiliary first coils wound about the core,
said auxiliary winding generating a plurality of auxiliary poles at respective arcuately spaced apart auxiliary pole locations,
each of said auxiliary first coils including a pair of arcuately spaced apart, generally axially extending auxiliary primary slot portions,
each of said auxiliary primary slot portions extending through a corresponding one of the slots,
each of said auxiliary pole locations coinciding with a corresponding one of the auxiliary primary slot portions such that the auxiliary winding is a full pitch winding,
said stator further including a third winding,
said third winding being a second-main winding that is electrically in phase with the first-main winding,
said second-main winding including a plurality of second-main first coils wound about the core,
said second-main winding generating a plurality of second-main poles at respective arcuately spaced apart second-main pole locations,
each of said second-main first coils including a pair of arcuately spaced apart, generally axially extending second-main primary slot portions,
each of said second-main primary slot portions extending through a corresponding one of the slots,
each of said second-main pole locations coinciding with a corresponding one of the second-main primary slot portions such that the second-main winding is a full pitch winding.

* * * * *